(12) United States Patent
Vollmer et al.

(10) Patent No.: US 6,859,701 B2
(45) Date of Patent: Feb. 22, 2005

(54) METHOD OF CONTROLLING ACCESS TO DEVICES IN A VEHICLE COMMUNICATION NETWORK

(75) Inventors: Vasco Vollmer, Gartow (DE); Matthias Hofmann, Freital (DE)

(73) Assignee: Robert Bosch GmbH, Stuttgart (DE)

( * ) Notice: Subject to any disclaimer, the term of this patent is extended or adjusted under 35 U.S.C. 154(b) by 175 days.

(21) Appl. No.: 10/276,506

(22) PCT Filed: Mar. 30, 2001

(86) PCT No.: PCT/DE01/01266

§ 371 (c)(1),
(2), (4) Date: Nov. 15, 2002

(87) PCT Pub. No.: WO01/89175

PCT Pub. Date: Nov. 22, 2001

(65) Prior Publication Data

US 2004/0039505 A1 Feb. 26, 2004

(30) Foreign Application Priority Data

May 16, 2000 (DE) .......................... 100 23 705

(51) Int. Cl.⁷ .............................................. G06F 19/00
(52) U.S. Cl. ........................................ 701/36; 307/10.1
(58) Field of Search ............................... 701/1, 36, 48; 307/9.1, 10.1

(56) References Cited

U.S. PATENT DOCUMENTS

| | | | | |
|---|---|---|---|---|
| 5,938,708 | A | * | 8/1999 | Wallace et al. ................ 701/48 |
| 5,957,985 | A | | 9/1999 | Wong et al. |
| 6,023,232 | A | * | 2/2000 | Eitzenberger ................ 340/988 |
| 6,292,718 | B2 | * | 9/2001 | Staiger ........................... 701/1 |
| 6,434,459 | B2 | * | 8/2002 | Wong et al. ................... 701/36 |
| 6,525,432 | B2 | * | 2/2003 | Heckmann et al. ........ 307/10.1 |
| 6,526,460 | B1 | * | 2/2003 | Dauner et al. ................ 710/65 |
| 2003/0078699 | A1 | * | 4/2003 | Harms et al. ................... 701/1 |
| 2003/0120396 | A1 | * | 6/2003 | Vollmer et al. ................ 701/1 |
| 2003/0171852 | A1 | * | 9/2003 | Vollmer et al. ................ 701/1 |
| 2004/0024502 | A1 | * | 2/2004 | Squires et al. ............... 701/33 |
| 2004/0054445 | A1 | * | 3/2004 | Vollmer et al. ................ 701/1 |

FOREIGN PATENT DOCUMENTS

EP          0 814 447          12/1997

OTHER PUBLICATIONS

Kiencke U et al.: "Open Systems and Interfaces For Distributed Electronics In Cars (OSEK)" SAE Technical Paper Series, US, Society of Automotive Engineers, Warrendale, PA, 1995, pp. 71–78.
Maury Wright: "Auto electronics for a multimedia future" EDN Access, 'Online! Retrieved from the Internet <URL:http://www.ednmag.com/ednmag/reg/1999/081999/pdfs/17cs.pdf> retrieved on Jul. 13, 2001.
Nicholas Navet: "Controller area network—CANs use within automobiles" IEEE Potentials, Oct. 1998–Nov. 1998, pp. 12–14.
STZP: "CAN Application Layer (CAL)" STP, 1996.
Bloks R H J: "The IEEE–1394 high speed serial bus" Philips Journal of Research, Elsevier, Amsterdam, NL, vol. 50, No. 1, 1996, pp. 209–216.

* cited by examiner

Primary Examiner—Gary Chin
(74) Attorney, Agent, or Firm—Kenyon & Kenyon

(57) ABSTRACT

A method of controlling access to devices in a vehicle communications network and regulating access of an application to devices required for the application. Priorities are issued for this access. A driver manager makes the required drivers for operating and controlling the individual devices available to the application. A resource manager allocates or assigns the devices to a requesting application in accordance with their priority and availability.

11 Claims, 2 Drawing Sheets

METHOD OF CONTROLLING ACCESS TO DEVICES IN A VEHICLE COMMUNICATION NETWORK

FIELD OF THE INVENTION

The present invention relates to a method of controlling access to devices in a vehicle communications network.

BACKGROUND INFORMATION

Vehicle communications networks may be used in a vehicle to interlink various components from the multimedia area. A user may start an application on a device which may require additional devices for its execution. The devices connected to the vehicle communications network may be placed at various locations in the motor vehicle.

SUMMARY OF THE INVENTION

An exemplary method according to the present invention for controlling access to devices in a vehicle communications network may provide that access to the devices that are connected to the vehicle communications network be controlled according to priorities. Through an exemplary system of the exemplary method according to the present invention, the interaction of the driver manager, the resource manager, and the application may be regulated. By issuing priorities, applications may be ranked according to their importance. Therefore, some applications may gain a preference over other applications in allocation of the devices.

The devices requested by the application may be allocated to that application for only a certain period of time. This may prevent an application from claiming a resource, i.e., a device, for an excessively long period of time if other applications that operate with the same priority for the devices also require access to these devices. This may permit a higher degree of fairness for the various applications.

In addition, an application requesting devices having a higher priority than an application using these devices at the moment may receive these devices allocated to it so that the higher priority prevails. This may be desirable in emergency situations in particular or when warnings are to be issued to the driver. For example, a traffic message may be received by a radio receiver in the vehicle, the radio receiver being connected to the vehicle communications network, while the driver is listening to music from a compact disc on a CD player at the moment, so that the CD player is at the moment occupying the audio amplifier together with the loudspeaker as a device. However, the traffic message may then request the audio amplifier together with the loudspeaker with a higher priority than the CD player. Therefore, the application controlling the CD player may be interrupted, so that the audio amplifier and the loudspeaker are available for the traffic message.

The application may be assigned to an application layer, while the driver manager may be assigned to the Common Interface for Automotive Networks (CIAN). This may yield an allocation which may permit a standardized interface definition between these layers. The various applications allocated to the application layer may then access the driver manager in the same manner.

One application may be able to call up another application which is also available on another device, if required. Drivers and resources may then be allocated according to the two applications.

The IEEE 1394 bus, also referred to as a firewall, may be used as the bus system. It may be suitable in particular for connecting multimedia components.

The drivers may be either already stored on the devices together with the applications, or they may be loaded from other devices such as a database, or they may be generated as needed by appropriate software and data.

A device may have an arrangement for acting as a resource manager and/or as a driver manager. Devices from which applications are called up may have an arrangement for implementing the exemplary method according to the present invention.

DETAILED DESCRIPTION

Vehicle communications networks may be used to an increasing extent in motor vehicles to interlink various components from the multimedia area. Such components may include a radio receiver, a car PC, a navigation unit, a loudspeaker system, and a CD player. A user may then start an application on a device, but the application may require other devices connected to the vehicle communications network for execution.

Therefore, an exemplary method may be used to control access to devices in a vehicle communications network according to present invention, with an application creating a list of the devices required by the application. The drivers required for these devices may be requested by a driver manager, which may then request the corresponding devices from a resource manager with a priority defined by the application.

Figure 1:
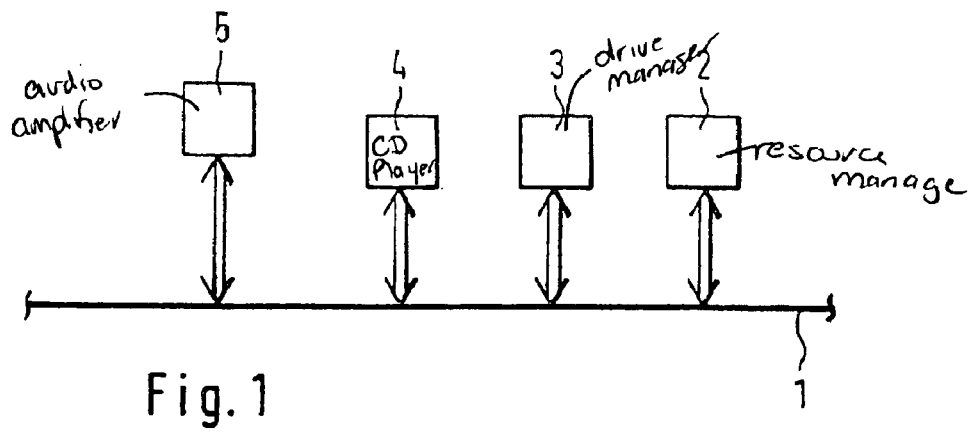
FIG. 1 shows a configuration of a vehicle communications network.

FIG. 1 shows a block diagram of a configuration of a vehicle communications network. A resource manager 2, a driver manager 3, a CD player 4, and a loudspeaker having an audio amplifier are connected to a bus 1 via data inputs/outputs. All the components connected to bus 1 have bus controllers to permit data transfer over bus 1. More or fewer devices may be connected to bus 1 than illustrated here. Bus 1 here is a bus according to IEEE 1394, but a MOST bus may also be used. Only the transfer of data over this bus 1 may be important, and both electric lines and optical transmission arrangements may be used.

Figure 2:
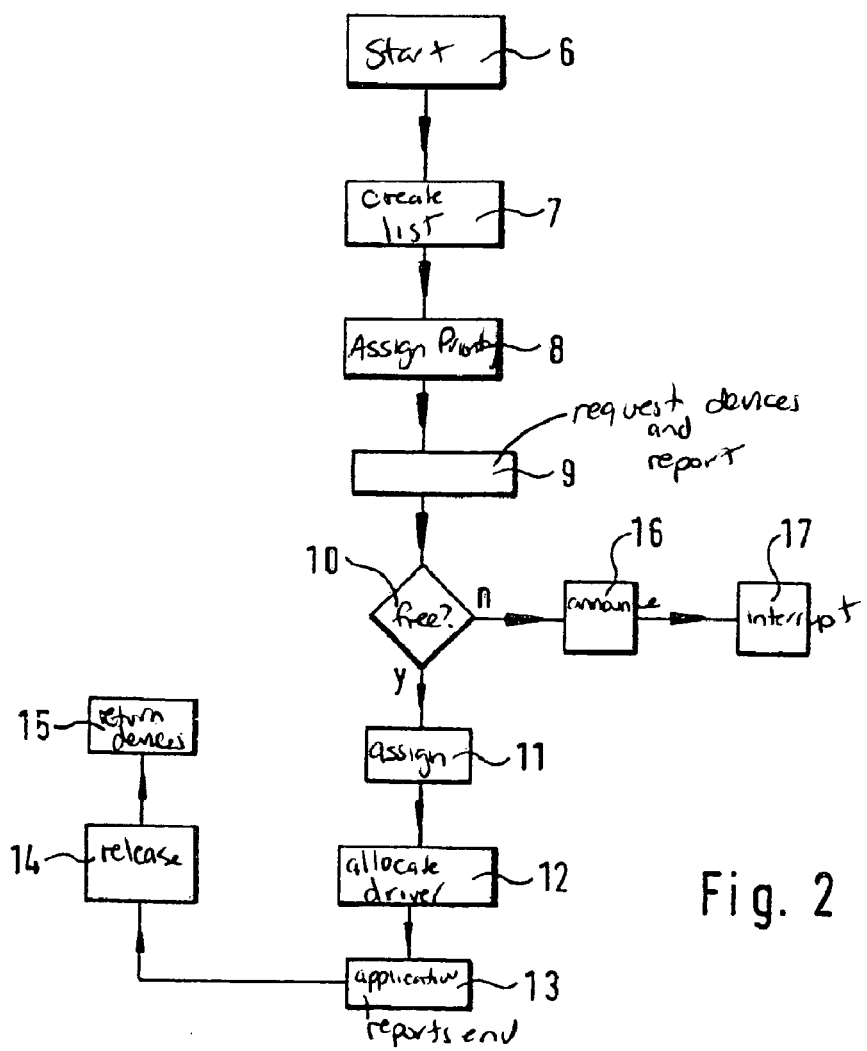
FIG. 2 shows a flow chart of an exemplary method according to the present invention.

FIG. 2 shows a flow chart of the exemplary method according to the present invention for controlling access to devices in a vehicle communications network 1. In exemplary method step 6, an application is started on driver manager 3 by a driver in a vehicle in which the vehicle communications network, bus 1, is located. As an alternative, driver manager 3 may be on a different device from the application. Furthermore, each device which has an application may also have a driver manager.

In exemplary method step 7, the application creates on driver manager 3 a list of the devices required for the application. The application here is called up on driver manager 3, for example, the device which has driver manager 3 and the application also supplying other applications.

As an alternative, the application may be called up on a device other than on driver manager 3. The device on which the application is called up has a connection to an input device, which may be controlled either by voice or manually. The driver or a passenger then calls up the application via this input device.

In method step 8, the application assigns a priority to the devices which are included in the list and are required for execution of the application; these devices are requested with this priority. This priority may depend on how important the application is. For example, if the application is a traffic message, which may be started automatically, then this application and the request associated with it for the required devices receive a high priority. A telephone call (in which case a mobile telephone is connected to bus 1) may also be assigned a high priority so that it is at least announced to the driver. Playback of sound recording media, i.e., applications intended only for entertainment, may have a low priority.

If a requested device is busy, then the priority decides whether or not the application requesting this busy device will gain access to it. If the priority of the requesting application is higher than that of the application already accessing the device, then this device is withdrawn from the application and assigned to the requesting application. If the priority is the same, then the application first receiving the devices assigned to it will continue to access the devices. After the application using the device releases it again, the waiting application then takes over the device. For this, resource manager 2 makes an entry to note the waiting application. In an exemplary refinement of the exemplary method according to the present invention, an application may access a device for a certain period of time only after the device has been assigned to a waiting application, if any. If there is a waiting application, then the application from which the device has been withdrawn because the time has elapsed may request this device again.

In method step 9, driver manager 3 requests the devices in the list from resource manager 2 and reports the respective priority. In method step 10, resource manager 2 checks on whether or not the devices are free. If the devices are free, then in method step 11, the devices are assigned, and resource manager 2 makes corresponding entries in its memory for managing the resources. The user may have started an application here, starting CD player 4. To this end, the loudspeaker together with audio amplifier 5 is required as a device for acoustic playback. Therefore, in method step 11, CD player 4 and the loudspeaker together with audio amplifier 5 are allocated to the application.

Then in method step 12, the device is accessed by driver manager 3, which allocates the corresponding drivers for CD player 4 and the audio amplifier together with loudspeaker 5 to the application. Then the application is executed. In method step 13, the application reports its end, so that then in method step 14, driver manager 3 releases the devices that have been accessed, i.e., CD player 4 and the audio amplifier together with loudspeaker 5. In method step 15, the devices, CD player 4 and audio amplifier 5 together with the loudspeaker, are returned to the application if previously another application having a lower priority had occupied these devices, and then the devices were withdrawn from these applications.

If it is found in method step 10 that the devices requested by the application are not free, then in method step 16 this is announced to the application so that then the application is not executed in method step 17. In other words, the application is interrupted here, e.g., by putting it in a pause mode, so it may then be started when these devices are free. Therefore, resource manager 2 has an entry that the application started on driver manager 3 has requested these devices, i.e., a waiting list is corrected. As an alternative, a user may receive an acknowledgment that the application is not executable at the moment and for the user to terminate the application and then start it again later if desired.

Figure 3:
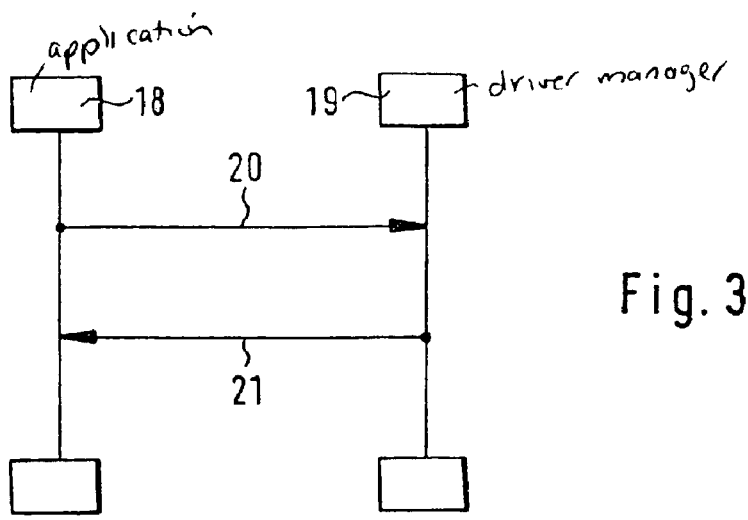
FIG. 3 shows the initialization of an application.

FIG. 3 shows the initialization of an application in a time chart. Application 18 sends to driver manager 19 an inquiry 20 as to which devices are available and which properties the corresponding drivers have. The application then recognizes whether it is executable at all, because with message 21, application 18 receives this required information from the driver manager, so that only selective access to the corresponding devices is made possible with the device-specific drivers.

Figure 4:
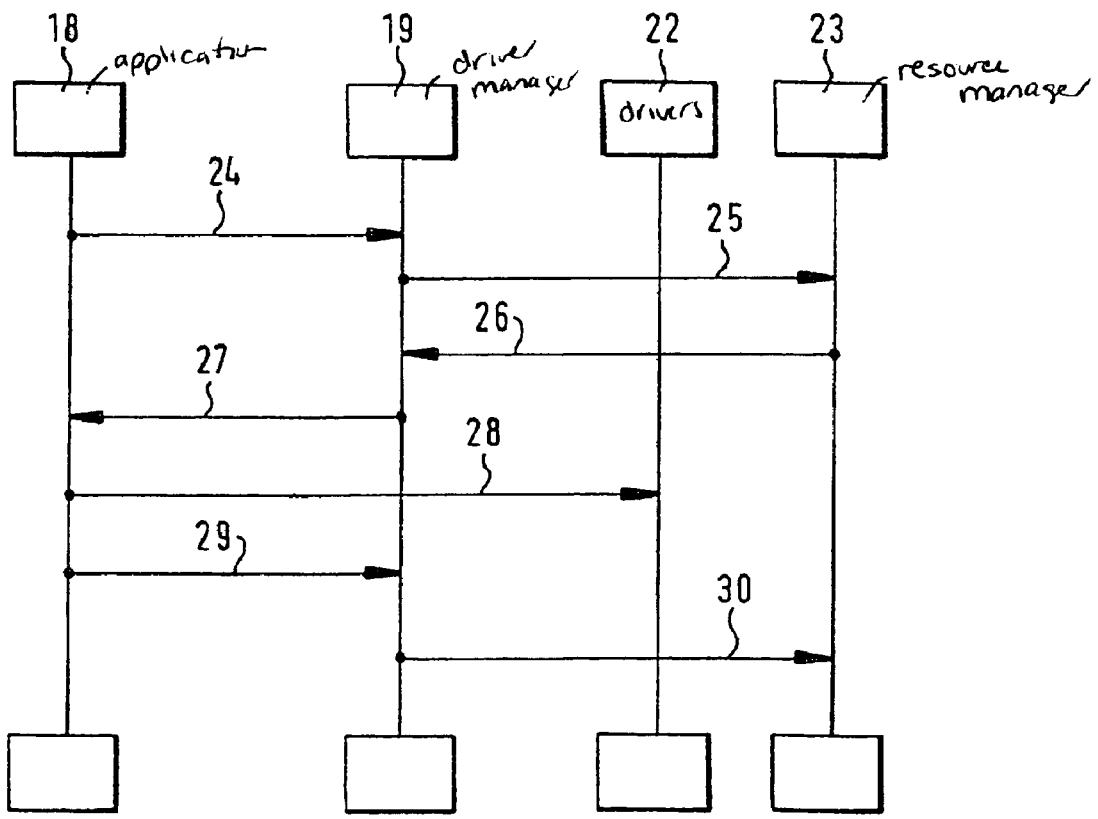
FIG. 4 shows the device access control.

FIG. 4 shows a flow chart of a successful device access control. The messages described here are transmitted over the vehicle communications network. Application 18 sends the device list it has generated, together with the device numbers and the corresponding devices, to driver manager 19. This occurs with message 24. Then driver manager 19 sends resource manager 23 message 25, which inquires whether these devices are available on the basis of the device identification numbers and the corresponding priorities. With message 26, resource manager 23 answers this inquiry in the affirmative to driver manager 19. Then with message 27, driver manager 19 sends to application 18 the message that the devices are available, with the corresponding identification numbers, and it sends the corresponding identification numbers of the drivers for these devices, so that the application may then start the access.

Then application 18 accesses drivers 22 via message 28 to control the devices that have been allocated. After the application has ended, it sends message 29 to driver manager 19 to report this to the driver manager. Again, the corresponding device numbers are reported to the driver manager. Driver manager 19 then reports to the resource manager with message 30 that the devices having the corresponding identification numbers are released again.

An application may also call up another application using the exemplary method according to the present invention, both applications then creating lists, if required, to request corresponding devices. An application may then naturally call up only an application which is not requesting the same devices, because otherwise there may be a conflict. Driver manager 19 allocates application identification numbers for drivers already stored on the device of the application, or driver manager 19 generates these drivers via corresponding software, if required, or driver manager 19 loads the drivers from a database which manages these drivers centrally.

At least one device has an arrangement, processor and memory to execute the resource manager function. Another device has an arrangement, processor and memory, to ensure the executability of the driver manager function. Devices on which the applications are called up have an arrangement, so that priorities are assigned to the requests according to the application.

The applications may be assigned to an application layer, while the driver manager may be assigned to the Common Interface Automotive Network layer (CIAN). The application layer may be placed on the CIAN layer. This may permit a standardization of interfaces. Applications access the driver manager via the same interface.

What is claimed is:

1. A method of controlling access to devices in a vehicle communications network, the devices being placed in different locations in a vehicle and applications being made available for call-up on specific devices in the vehicle communications network, the method comprising:

configuring an application to create a list of the devices required for the application when the application is called up on one of the devices;

configuring the application to define a priority of required devices;

configuring a driver manager, which manages drivers required for the application, to request access to the required devices from a resource manager with the priority defined by the application and by using the list of the devices;

configuring the resource manager to assign the required devices to the driver manager if the required devices are free, and to report to the driver manager if the required devices are not free;

configuring the driver manger to allow application access to the required devices via respective drivers; and configuring the driver manager to report to the resource manager upon an end of the application that the required devices are free.

2. The method of claim 1, further comprising:

configuring the resource manager to withdraw devices requested by the application, from the application, after a predefined period of time.

3. The method of claim 1, further comprising:

assigning a device occupied by a first application having a first priority to a second application if a priority of the second application is higher than the first priority.

4. The method of claim 1, further comprising:

assigning the application to an application layer; and assigning the driver manager to a Common Interface for Automotive Networks.

5. The method of claim 1, further comprising:

configuring a first application to call up a second application.

6. The method of claim 5, further comprising:

making the second application available on another device.

7. The method of claim 1, wherein a bus system according to IEEE 1394 is used as the vehicle communications network.

8. The method of claim 1, further comprising:

one of storing drivers on a device of the application, configuring the driver manager to generate the drivers as needed, and configuring the driver manager to load the drivers from another device.

9. A device for controlling access to devices in a vehicle communications network, the devices being placed in different locations in a vehicle and applications being made available for call-up on specific devices in the vehicle communications network, the device comprising:

a resource manager to receive a request from a driver manager for access to devices required by an application, the required devices being listed with a priority defined by the application, and to assign the required devices to the driver manager if the required devices are fee, and to report to the driver manager if the required devices are not free, and to receive a report from the driver manager upon end of the application that the required devices are free.

10. A device for controlling access to devices in a vehicle communications network, the devices being placed in different locations in a vehicle and applications being made available for call-up on specific devices in the vehicle communications network, the device comprising:

a driver manager to request access to devices required by application from a resource manager using a list of the required devices created by the application with a priority defined by the application, and to receive from the resource manager one of an acknowledgment of the request if the required devices are free and a report if the required devices are not free, and to allow application access to the required devices that are acknowledged as free, and to report to the resource manager upon an end of the application that the required devices are five.

11. A device for controlling access to devices in a vehicle communications network, the devices being placed in different locations in a vehicle and applications being made available for call up on specific devices in the vehicle communications network, the device comprising:

an application to create a list of devices required for the application when the application is called up on a specific device, and to define priorities associated with the list of required devices, and to send the list and the priorities to a driver manager in order to request access of the required devices and to receive a confirmation of which required devices are free, and to report to the driver manager upon an end of the application that the required devices are free.

* * * * *

UNITED STATES PATENT AND TRADEMARK OFFICE
CERTIFICATE OF CORRECTION

PATENT NO. : 6,859,701 B2
DATED : February 22, 2005
INVENTOR(S) : Vasco Vollmer et al.

It is certified that error appears in the above-identified patent and that said Letters Patent is hereby corrected as shown below:

Column 6,
Line 10, change "devices are fee," to -- Devices are free, --
Line 30, change "are five." to -- are free. --

Signed and Sealed this

Seventh Day of June, 2005

JON W. DUDAS
*Director of the United States Patent and Trademark Office*